(12) United States Patent
Ng et al.

(10) Patent No.: US 10,875,093 B2
(45) Date of Patent: *Dec. 29, 2020

(54) SELECTIVE MATERIAL DISPENSING IN ADDITIVE MANUFACTURING

(71) Applicant: Applied Materials, Inc., Santa Clara, CA (US)

(72) Inventors: Hou T. Ng, Campbell, CA (US); Nag B. Patibandla, Pleasanton, CA (US); Ajey M. Joshi, San Jose, CA (US); Bharath Swaminathan, San Jose, CA (US); Ashavani Kumar, Sunnyvale, CA (US); Eric Ng, Mountain View, CA (US); Bernard Frey, Livermore, CA (US); Kasiraman Krishnan, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1140 days.

This patent is subject to a terminal disclaimer.

(21) Appl. No.: 15/212,075

(22) Filed: Jul. 15, 2016

(65) Prior Publication Data

US 2017/0014910 A1    Jan. 19, 2017

Related U.S. Application Data

(60) Provisional application No. 62/194,151, filed on Jul. 17, 2015, provisional application No. 62/361,450, filed on Jul. 12, 2016.

(51) Int. Cl.
| | | |
|---|---|---|
| *B22F 3/10* | (2006.01) | |
| *B22F 3/105* | (2006.01) | |
| *B33Y 10/00* | (2015.01) | |
| *B29C 64/153* | (2017.01) | |
| *B33Y 50/02* | (2015.01) | |
| *B22F 1/00* | (2006.01) | |
| *B22F 3/00* | (2006.01) | |
| *B33Y 30/00* | (2015.01) | |

(52) U.S. Cl.
CPC .......... *B22F 3/1055* (2013.01); *B22F 1/0014* (2013.01); *B22F 1/0059* (2013.01); *B22F 3/008* (2013.01); *B29C 64/153* (2017.08); *B33Y 10/00* (2014.12); *B33Y 50/02* (2014.12); *B22F 2003/1056* (2013.01); *B22F 2003/1057* (2013.01); *B22F 2207/13* (2013.01); *B22F 2998/10* (2013.01); *B22F 2999/00* (2013.01); *B33Y 30/00* (2014.12); *Y02P 10/295* (2015.11)

(58) Field of Classification Search
CPC ........ B22F 3/10; B22F 3/1055; B22F 1/0014; B22F 3/008; B23K 26/342; B23K 26/703; B29C 64/153; B29C 64/20; B33Y 10/00; B33Y 30/00; Y02P 10/295
USPC ....................................... 419/1, 55
See application file for complete search history.

(56) References Cited

U.S. PATENT DOCUMENTS

| | | | |
|---|---|---|---|
| 5,527,877 A | 6/1996 | Dickens et al. | |
| 7,389,154 B2 | 6/2008 | Hunter et al. | |
| 7,713,454 B2 | 5/2010 | Larsson | |
| 9,505,057 B2 | 11/2016 | Nordkvist et al. | |
| 2005/0012247 A1 | 1/2005 | Kramer et al. | |
| 2014/0348692 A1 | 11/2014 | Bessac et al. | |
| 2015/0071809 A1 | 3/2015 | Nordkvist et al. | |
| 2017/0014907 A1* | 1/2017 | Ng ........................ | B22F 3/1055 |
| 2017/0014911 A1 | 1/2017 | Ng et al. | |

FOREIGN PATENT DOCUMENTS

| | | |
|---|---|---|
| CN | 100515620 C | 7/2009 |
| EP | 1583627 | 10/2005 |
| EP | 1949989 | 7/2008 |
| JP | 2000-328106 | 11/2000 |
| JP | 3621703 | 2/2005 |
| WO | WO 2004/056511 | 7/2004 |
| WO | WO 2016/205758 | 12/2016 |

OTHER PUBLICATIONS

Office Action in Chinese Application No. 201680049029.6, dated May 15, 2019, 8 pages (with Search Report).
EP Search Report in European Application No. 16828331.5, dated Mar. 7, 2019, 10 pages.
International Search Report and Written Opinion in International Application No. PCT/US2016/042633, dated Oct. 26, 2016, 17 pages.

* cited by examiner

*Primary Examiner* — Edward M Johnson
(74) *Attorney, Agent, or Firm* — Fish & Richardson P.C.

(57) ABSTRACT

Additive manufacturing includes successively forming a plurality of layers on a support. Depositing a layer from the plurality of layers includes dispensing first particles, selectively dispensing second particles in selected regions corresponding to a surface of the object, and fusing at least a portion of the layer. The layer has the first particles throughout and the second particles in the selected regions. Alternatively or in addition, forming the plurality of layers includes depositing multiple groups of layers. Depositing a group of layers includes, for each layer in the group of layers dispensing a feed material to provide the layer, and after dispensing the feed material and before dispensing a subsequent layer fusing a selected portion of the layer. After all layers in the group of layers are dispensed, a volume of the group of layers that extends through all the layers in the group of layers is fused.

10 Claims, 8 Drawing Sheets

SELECTIVE MATERIAL DISPENSING IN ADDITIVE MANUFACTURING

CROSS-REFERENCE TO RELATED APPLICATIONS

This application claims priority to U.S. Provisional Application Ser. No. 62/361,450, filed on Jul. 12, 2016, and to U.S. Provisional Application Ser. No. 62/194,151, filed on Jul. 17, 2015, the entire disclosures of which are incorporated by reference.

TECHNICAL FIELD

This specification relates to additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA). These processes can differ in the way layers are formed to create the finished objects and in the materials that are compatible for use in the processes.

Conventional systems use an energy source for sintering or melting a powdered material. Once all the selected locations on the first layer are sintered or melted, a new layer of powdered material is deposited on top of the completed layer and the process is repeated layer by layer until the desired object is produced.

SUMMARY

In one aspect, a method of additive manufacturing of an object includes successively forming a plurality of layers on a support. Depositing a layer from the plurality of layers includes dispensing first particles on a support or an underlying layer, selectively dispensing second particles on the support or the underlying layer in selected regions corresponding to a surface of the object, and fusing at least a portion of the layer. The layer has the first particles throughout and the second particles in the selected regions.

Implementations may include one or more of the following.

The second particles may be dispensed after the first particles so that the second particles infiltrate into a layer of first particles. The first particles may be pushed from a reservoir across the support or underlying layer or ejected from a nozzle. The first particles and the second particles may be mixed to provide a mixture of particles, and the mixture of particles may be selectively dispensed in the selected regions. The mixture of particles may be ejected from a nozzle.

The first particles may have a first mean diameter, and the second particles may have a second mean diameter at least two times smaller than the first mean diameter. The second mean diameter may be at least four times smaller than the first mean diameter. The second mean diameter may be about 100 nm to 2 µm. The first mean diameter may be about 5 µm to 10 µm. The first particles and the second particles have the same material composition. Fusing the portion of the layer may include applying a laser beam to the layer of the first particles and second particles.

In another aspect, a method of additive manufacturing of an object includes successively forming a plurality of a layers on a support. Forming the plurality of layers includes depositing multiple groups of layers, each group of layers including multiple layers. Depositing a group of layers from the plurality of layers includes, for each layer in the group of layers dispensing a feed material on a support or an underlying layer to provide the layer, for each layer in the group of layers after dispensing the feed material to provide the layer and before dispensing a subsequent layer fusing a selected portion of the layer corresponding to the object, and after all layers in the group of layers are dispensed fusing a volume of the group of layers that extends through all the layers in the group of layers.

Implementations may include one or more of the following.

The portion of the layer may corresponds to an exterior surface of the object. Regions of at least two adjacent layers in the group of layers may have perimeters that are laterally offset. Regions of at least two adjacent layers in the group of layers may have perimeters that are laterally offset so as to provide a sloped exterior surface of the object.

Dispensing the feed material may include dispensing first particles on the support or an underlying layer, and selectively dispensing second particles on the support or the underlying layer in selected regions, such that the layer has the first particles throughout and the second particles in the selected regions. The second particles may have a second mean diameter at least two times smaller than a first mean diameter of the first particles. The second particles may be dispensed after the first particles so that the second particles infiltrate into a layer of first particles. The selected regions and the selected portions may correspond to an exterior surface of the object. Fusing the selected portion of the layer may include applying a first laser beam or ion beam to the layer. Fusing the volume of the group of layers may include applying a second laser beam or ion beam to the group of layers. The second laser beam or ion beam may have greater power than the first laser beam or ion beam. The group of layers may include three to ten layers.

In another aspect, an additive manufacturing apparatus for forming an object includes a support, a first dispenser to deliver first particles on the support or an underlying layer, a second dispenser to selectively deliver second particles on the support or an underlying layer, an energy source to fuse the first particles and the second particles, and a controller coupled to the first dispenser, the second dispenser and the energy source. The controller is configured to cause the apparatus to successively form a plurality of layers on a support. The controller is configured to form a layer from the plurality of layers by causing the apparatus to dispense the first particles and second particles such that the layer has the first particles throughout and the second particles in a selected region, the selected region corresponding to a surface of the object, and fuse at least a first portion of the layer including the selected regions and a second portion of the layer that does not include the selected region.

Implementations may include one or more of the following.

The selected region may correspond to an exterior surface of the object. The selected region need not include at least a portion of the layer in which the first particles are fused to provide an interior of the object.

A first reservoir may hold the first particles and a second reservoir may hold the second particles. The first particles may have a first mean diameter and the second particles may have a second mean diameter at least two times smaller than the first mean diameter. The first particles and the second particles may have the same material composition.

The controller may be configured to cause the second particles to be dispensed after the first particles so that the second particles infiltrate into a layer of first particles. The first dispenser may include a reservoir positioned adjacent the support and a pusher configured to push the first particles from the reservoir across the support or underlying layer. The second dispenser comprises an ejector having a nozzle to eject the second particles. The second dispenser may include a mixer configured to receive the first particles and the second particles and provide a mixture of particles to the first dispenser. The controller may be configured to selectively dispense the second particles by controlling ejection of the mixture of particles from a nozzle. The energy source may be a laser or ion beam source.

In another aspect, an additive manufacturing apparatus for forming an object includes a support, a dispenser to deliver feed material on the support or an underlying layer, an energy source to fuse the feed material, and a controller coupled to the dispenser and the energy source. The controller is configured to cause the apparatus to successively form a plurality of a layers on a support, where the plurality of layers includes multiple groups of layers. The controller is configured to form a group of layers from the multiple groups by causing the apparatus to for each layer in the group of layers dispense a feed material on a support or an underlying layer to provide the layer, for each layer in the group of layers after dispensing the feed material to provide the layer and before dispensing a subsequent layer fusing a selected portion of the layer corresponding to the object, and after all layers in the group of layers are dispensed fuse a volume of the group of layers that extends through all the layers in the group of layers.

Implementations may include one or more of the following.

The controller may be configured such that the portion of the layer corresponds to a surface of the object, e.g., an exterior surface of the object. The group of layers may include three to ten layers.

The controller may be configured such that regions of at least two adjacent layers in the group of layers have perimeters that are laterally offset. The controller may be configured such that regions of at least two adjacent layers in the group of layers have perimeters that are laterally offset so as to provide a sloped exterior surface of the object.

The dispenser may include a first dispenser to dispense first particles on the support or an underlying layer and a second dispenser to selectively dispense second particles on the support or the underlying layer in selected regions. The controller may be configured such that the layer has the first particles throughout and the second particles in the selected regions.

A first reservoir may hold the first particles and a second reservoir may hold the second particles. The first particles may have a first mean diameter and the second particles may have a second mean diameter at least two times smaller than the first mean diameter. The controller may be configured to cause the second dispenser to dispense the second particles after the first dispenser dispenses the first particles so that the second particles infiltrate into a layer of first particles.

The energy source may include a laser or ion beam source. The energy source may include a first energy source to fuse the selected portion of the layer and a second energy source to fuse the volume of the group of layers. The first energy source may include a first laser or ion beam source and the second energy source may include a second laser or ion beam source. The second laser or ion beam source may have a greater power than the first laser or ion beam source.

Advantages of the foregoing may include, but are not limited to, the following. By dispensing second particles having a smaller mean diameter than the first particles in selected regions of a layer, an additive manufacturing (AM) apparatus implementing any combination of the AM processes described herein can precisely control features of the object in the selected regions. For example, the second particles dispensed in the selected regions can increase a density of specific portions of the object so that those specific portions can have improved surface features. These features may include greater structural rigidity and lower surface roughness. The AM processes can fuse the powders within the selected regions to improve the structural rigidity in the specific portions of the finished object without increasing weight and density of other portions, thus reducing the impact of these portions on the overall weight of the object.

In addition to controlling surface features, these processes include operations enabling the AM apparatus to form exterior surfaces of the objects having complex geometries while also providing the improved surface features described above. Within each of the selected regions, the AM apparatus can select the location in which the first and second particles are fused to control a profile of an exterior surface of the object. For example, incorporating a lateral offset between regions of each layer having first and second particles can form angled and sloped geometry on exterior surfaces.

The methods described herein can achieve these complex geometries and improved surface features without significantly reducing overall throughput of the AM apparatus. The AM apparatus does not dispense second particles within interior portions where precise geometries and low surface roughness may not be needed. Instead, the AM apparatus can dispense the second particles in the exterior surfaces that affect aesthetics, functionality, handling, and fit, among other features, of the object. The interior portions can only include the first particles.

Alternatively or in addition to the use two types of particles, the AM apparatus can fuse individual layers in regions needing precise geometries, but simultaneously fuse several layers in a single operation in regions, e.g., interior portions, that do not need precise geometries. Thus, the operations to fuse these interior portions require less time than would be required if the operations fused these interior portions directly after dispensing the first particles in each layer.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
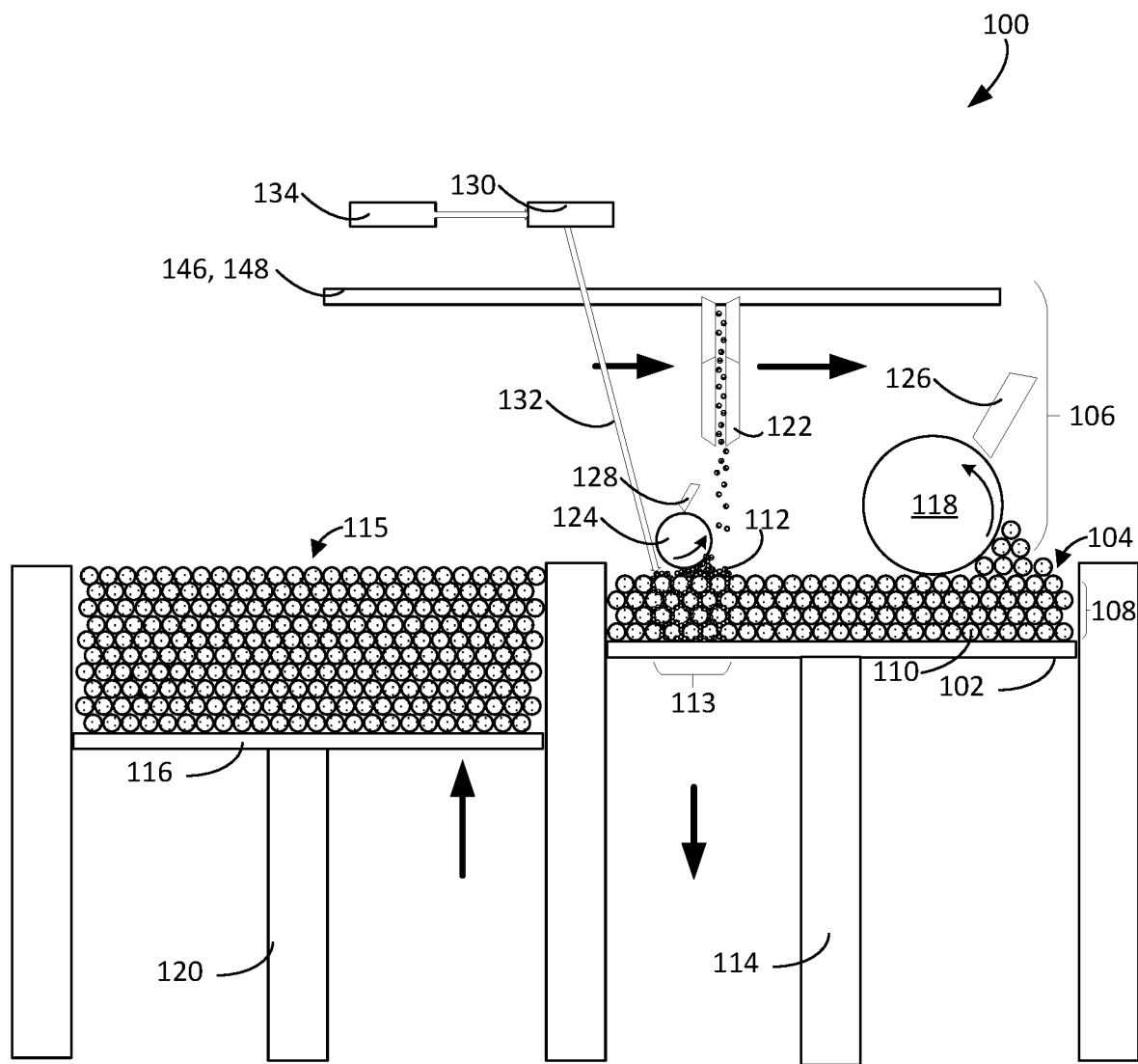
FIG. 1A is a schematic side view of an example additive manufacturing apparatus.

Additive manufacturing (AM) processes using powder particles can generate objects that require high dimensional accuracy and high-resolution surface features, among other attributes. In AM, powder particle size, binder viscosity, droplet size, and printing layer thickness can determine the strength and surface quality of resulting object. For example, powder particle size and homogeneity of distribution of the powder particles can affect the 3D printing process. If the powder particle size is too small, because of flowability characteristics of the powder particles, the powder particles may not be able to spread in thin layers. If the powder particle size is too large, after the powder particles are fused, the printed part may have undesirable features, such as rough surface finishing and low surface resolution. These undesirable features may become even more prominent when an exterior surface of the printed part includes sloped profiles. To reduce the prominence of these undesirable features, the AM process can form thinner layers of the powder particles during fabrication of the printed part. However, the successive dispensing and fusing of the thinner layers can increase an amount of time to produce the printed part and reduce an overall throughput of the AM process.

In some AM processes, bi-modal or tri-modal powder particles, each having a different mean diameter, can be selectively dispensed to improve resolution and surface finish of the printed part without impacting the throughput of the AM process. For example, an AM process can form a layer of first powder particles having a larger mean diameter. The AM process can dispense second powder particles having smaller mean diameter in selected regions of the layer—such as, for example, regions that become exterior surfaces of the printed part where the improved resolution and reduced surface roughness are highly desirable—so that those selected regions can benefit from the advantages bestowed by use of smaller particle sizes. Those selected regions also contain the first powder particles, which can reduce the risk that the AM process will be unable to spread the second powder particles into thin layers.

The AM process can also differentially fuse the selected regions corresponding to the exterior surfaces of the printed part and other regions that corresponding to interior portions. While the AM process fuses the selected regions layer-by-layer to achieve the improved resolution and the reduced surface roughness, the AM process can fuse several layers at once of the other regions, as the interior portions of the object corresponding to the other regions may not require resolution or surface roughness as needed for the exterior surfaces. By infiltrating smaller second particles into layers of first particles and selectively fusing regions of the layers containing the second particles, the AM process can improve quality of the printed part without reducing throughput of the AM process.

Additive Manufacturing Apparatuses

FIG. 1A shows a front view of an example additive manufacturing (AM) apparatus 100, e.g. a selective laser sintering system (SLS), selective laser melting (SLM), or an electron beam melting system, that can be used to improve resolution and surface roughness of exterior surfaces of a printed object.

A support 102 of the AM apparatus 100 holds a fabrication powder bed 104 in which the object is fabricated. A powder delivery system 106 delivers a layer 108 of first powder particles 110 over the support 102, e.g., on the support or on a previously deposited layer on the support. The powder delivery system 106 then delivers smaller second powder particles 112 into a selected region 113 of the layer 108 of first powder particles 110. The first and the second powder particles 110, 112 are feed material for forming the object. The second powder particles have a smaller mean diameter than the first powder particles, e.g., by a factor of two or more.

In some implementations, the selected region 113 corresponds to a surface of the object. The surface can be an exterior surface that includes external or superficial features of the object. For example, the exterior surface of the object can be a portion of the object exposed to the environment after fabrication of the object is complete. Where additive manufacturing is used to simultaneously fabricate multiple components within a mechanical assembly, the surface of that object can be an exterior surface of a component within the mechanical assembly, e.g., a surface that interacts with and contacts other components inside the mechanical assembly.

The exterior surface can be distinguished from various interior surfaces, e.g., of struts, bracing, or similar pieces that extend through an interior volume of the object to provide structural support for the object. In some implementations, the selected region 113 corresponds to an exterior surface of a component of object that will be in a sliding or otherwise movable engagement of another surface of another component of the object. For example, if an object is constructed with multiple gears, the surfaces of the gears that will engage can be the selected region, even if the gears themselves are contained within an outer frame.

An energy source generates sufficient heat to fuse the powder particles 110, 112 to form portions of the object. The successively deposited and fused layers of powder particles 110, 112 form a fabricated object.

Materials for the first and second powder particles 110, 112 include metals, such as, for example, steel, aluminum, cobalt, chrome, and titanium, alloy mixtures, ceramics, composites, and green sand. In some implementations, the first and second powder particles 110, 112 are formed of different materials, while, in other cases, the first and second powder particles 110, 112 have the same material composition. In an example in which the AM apparatus 100 is operated to form a metal object, the first and second powder particles 110, 112 can have compositions that combine to form a metal alloy or intermetallic material.

The support 102 moves vertically with a piston 114 that controls the vertical height of the support 102. After each layer of the powder particles 110, 112 has been dispensed and fused, the piston 114 lowers the support 102. Any layers on the support 102 lower with the support 102 so that the assembly is ready to receive a new layer of powder. In some implementations, the piston 114 lowers in increments of an expected thickness for each layer so that, each time the piston 114 lowers the support 102, the layers on the support 102 are ready to receive the new layer.

The powder delivery system 106 delivers the first and the second powder particles 110, 112. The powder delivery system 106 includes a first dispensing system to deliver a layer of first powder particles 110 onto the support 102 or a previously dispensed layer (e.g., the layer 108) on the support 102. A second dispensing system of the power delivery system 106 delivers smaller second powder particles 112 onto the outer layer (e.g., the layer 108) of first powder particles 110.

The second dispensing system dispenses the second powder particles 112, for example, above the selected region 113 of the layer 108 so that the second powder particles 112 infiltrate into the layer 108 of the first powder particles 110 within the selected region 113. The second powder particles 112 can infiltrate the first powder particles 110 to the depth of a single layer, e.g., a single voxel depth.

The first dispensing system, using a powder delivery device, delivers the first powder particles 110 from a powder delivery bed 115 supported by a powder delivery platen 116 adjacent the support 102. The powder delivery device displaces first powder particles 110 from a powder delivery bed 115 to the fabrication powder bed 104 to form the layer 108 of the first powder particles 110. The powder delivery bed 115 serves as a reservoir for the first powder particles 110.

In FIG. 1A, the powder delivery device includes a main roller 118 that rotates and moves laterally parallel to both the surface of the support 102 and layers of powder material on the support 102. The main roller 118 pushes first powder particles 110 from the powder delivery bed 115 to the fabrication powder bed 104 to form the outermost layer of powder material. The main roller 118 displaces the first powder particles past a wall 146 separating the powder delivery platen 116 and powder delivery bed 115 from the support 102 and fabrication powder bed 104. The main roller 118 pushes the first powder particles 110 from the powder delivery bed 115 across the fabrication powder bed 104 to form the layer 108 of the first powder particles 110.

The AM apparatus 100 selects a height of the main roller 118 above a top surface of the fabrication powder bed 104 to deliver a desired thickness of the first powder material by controlling a powder delivery piston 120. The powder delivery piston 120 causes vertical motion of a powder delivery platen 116 to control the disbursement of the first powder particles 110 from the powder delivery bed 115. The powder delivery piston 120 moves the powder delivery platen 116 vertically upward by a height to provide a sufficient amount of the first powder to form the layer 108 of the first powder particles 110 over the support 102. The main roller 118 then displaces the first powder particles 110 to compact the layer 108 and move the first powder particles 110 such that they form a layer having a uniform thickness.

The thickness of each layer depends on, for example, the number of the first powder particles 110 stacked through a height of the layer or the mean diameter of the first powder particles 110. In some implementations, each layer of the first powder particles 110 is a single particle thick. In some cases, each layer has a thickness resulting from stacking multiple first powder particles 110 on top of each other. In some examples, each layer has a thickness of approximately one to four times the mean diameter of a first powder particle 110. FIG. 1A shows the layer 108 having a thickness of approximately four times the mean diameter of the first powder particles 110.

As or after the first dispensing system dispenses the first powder particles 110, the second dispensing system dispenses the second powder particles 112, which have a smaller mean diameter than the first powder particles. In some implementations, the second dispensing system includes one or more nozzles, e.g., a dispensing array 122, positionable above the fabrication powder bed 104 to dispense second powder particles 112 onto the layer 108 of first powder particles 110. In some implementations, the dispensing array 122 spans the width of the support 102, and scans across the length of the support to deliver the second powder particles. However, it is also possible for the dispensing array 122 to be smaller than the width of the support, and to scan in two perpendicular directions to cover the support 102. Also, rather than an array, the second dispensing system could include a single dispensing aperture. In some examples, multiple scans across the support 102 are performed with powder being delivered for each scan. The process can be repeated if the final thickness of the layer 108 is beyond a desired thickness, e.g., one to four times the mean diameter of a first powder particles.

Optionally, a secondary roller 124 of the second dispensing system compacts the second powder particles 112 dispensed into the voids of the layers of powder material. The secondary roller 124 can compact the layer 108 containing the first and second powder particles 110, 112 until the layer 108 reaches a desired thickness, e.g., one to four times the mean diameter of the first powder particles 110.

The second powder particles 112 are smaller than the first powder particles 110 such that, when the second powder particles 112 are dispensed on the layer 108 of the first powder particles 110, the second powder particles 112 infiltrate the layer of first powder particles 110 to fill voids between the first powder particles 110. The second powder particles 112 have, for example, a mean diameter that is at least 2 times smaller than the mean diameter of the first powder particles 110. The second powder particles 112 can be submicron or nano-particles. In some examples, the mean diameter of the second powder particles 112 is between 2 and 100 times, 3 and 50 times, or 2 and 10 times smaller than the mean diameter of the first powder particles 110. In some implementations, the first powder particles 110 have a mean diameter between 5 μm and 10 μm, and the second powder particles have a mean diameter between 100 nm and 2 μm.

The second dispensing system dispenses the second powder particles 112 within the selected region 113. In the selected region 113, which includes both the first and the second powder particles 110, 112, the second powder particles 112 fill the voids between the first powder particles 110. Within the layer 108 outside of the selected region 113, the layer 108 includes only the first powder particles 110. In some implementations, within the selected region 113, the second powder particles 112 provide approximately 15 to 30% by volume of the part of the layer 108 within the selected region 113, which includes a combination of the first and second powder particles 110, 112.

In some implementations, the dispensing array 122 is digitally addressable and/or includes a digitally addressable array head such that the dispensing array 122 is configured to deliver powder particles of different sizes and properties. The dispensing array 122 dispenses, for example, sub-micron particles or nano-particles and different materials or deposit powder particles of the same size or same material.

The dispensing array 122 includes, in some cases, a micro-dispensing array head that ejects the second powder particles 112 from a nozzle. The dispensing array 122 can dispense the second powder particles in a carrier fluid. The carrier fluid is, for example, a high vapor pressure carrier, such as Isopropyl Alcohol (IPA), ethanol, or N-Methyl-2-pyrrolidone (NMP). The dispensing array 122 further removes the carrier fluid using thermal evaporation or suction before the layer 108 is fused. In some cases, the dispensing array 122 is a dry dispensing mechanism using inert gas jets, e.g. argon, nitrogen, or mixed gases, and/or an ultrasonic agitation mechanism, to dispense the second powder particles 112.

The dispensing array 122 can have multiple nozzles with diameters between, for example, 500 nm and 1 µm, 1 µm and 50 µm, or 50 µm and 500 µm. The dispensing array 122 can include multiple nozzle heads, each of which can be made up of segmented nozzle heads laid out across the width of the fabrication powder bed. In some implementations, the dispensing array 122 uses a slot-based array head. The second dispensing system can deposit the second powder particles 112 at approximately a velocity of 0.1 m/s to 30 m/s and with or without a pulse frequency between, for example, 1 kHz and 50 kHz.

In some implementations, the dispensing array 122 ejects both the first and second powder particles 110, 112. The dispensing array 122 includes a mixture of the first and the second powder particles 110, 112 and ejects the mixture through a nozzle of the dispensing array 122 into the selected region 113.

In order to prevent the powder particles 110, 112 from sticking to the rollers 118, 124 when the roller 118, 124 deliver powder particles 110, 112 to the fabrication powder bed 104, the powder delivery system includes blades 126, 128 to clean the rollers 118, 124. The blade 126 of the first dispensing system prevents the first powder particles 110 from sticking to the main roller 118, and the blade 128 of the second dispensing system prevents the second powder particles 112 from sticking to the secondary roller 124. The blades 126, 128, when used to prevent powder particles from sticking to the rollers 118, 124 are positioned in close proximity to the rollers 118, 124 to effectively scrape any powder particles off the rollers 118, 124 as they rotate. The blades 126, 128 are positioned at a distance of, for example, less than the smallest diameter of the particles that are being dispensed or less than or equal to half the diameter of the smallest particles being dispensed.

The energy source of the AM apparatus 100 adds heat to the layer 108 to fuse the layer 108 of combined first and second powder particles 110, 112. In the example shown in FIG. 1A, the energy source is a beam device 130 for emitting a directed energy beam 132. The directed energy beam 132 is, for example, a laser beam. The AM apparatus 100 includes a scanner system 134, e.g., a linear actuator or laser galvo, that functions as a beam positioning control mechanism, directing the energy beam 132 to a target area of the layer 108. The scanner system 134 operates to aim the energy beam 132 and to modulate the energy beam 132 to selectively fuse a layer (e.g., the layer 108) of the powder material in the target area. The powder material includes the first powder particles 110, the second powder particles 112, or combinations thereof.

The energy beam 132 is directed at the powder material located on the support 102 in the fabrication powder bed 104 to selectively fuse together particles to form the fabricated object. The beam device 130 includes, for example, a laser, a laser head, a safety shutter, and a mirror assembly to accurately and selectively direct the energy beam 132 to regions of the layer 108. In some cases, the energy beam 132 is directed to a target area of the layer 108 only containing the first powder particles 110, and, in some cases, the energy beam 132 is directed to a target area containing both the first powder particles 110 and the second powder particles 112.

In some examples, the beam device 130 directs the energy beam 132 toward the selected region 113 to fuse the first and the second powder particles 110, 112 within the selected region 113 without fusing the first powder particles 110 in a region outside of the selected region 113. As described herein, the selected region 113 corresponds to a surface, e.g., the exterior surface, of the object to be printed. In contrast, the region outside of the selected region 113 may correspond to internal or interior portions of the object. In some examples, the beam device 130 directs the energy beam 132 to the region outside of the selected region 113 to fuse the first powder particles 110 to form internal geometry and structure.

To increase throughput of fusing the region having only the first powder particles 110, the beam device 130 can increase a power of the energy beam 132 so that the energy beam 132 can cause multiple layers of the first powder particles 110 to fuse. The energy beam 132 can fuse, for example, a single layer of particles 110, 112 at a time. In some cases, the energy beam 132 can also fuse a group of layers of the particles 110, 112, and thus can require a greater amount of power than the amount of power required for fusing a single layer alone. In addition, for a single layer of particles, fusing a region of the first powder particles 110 alone can require less energy than fusing a region including both the first and the second powder particles 110, 112, as the region including both types of particles 110, 112 has a greater density. The AM apparatus 100 thus selects the power of the energy beam 132 based on the number of layers to be fused as well as the composition of the portion to be fused.

Figure 1B:
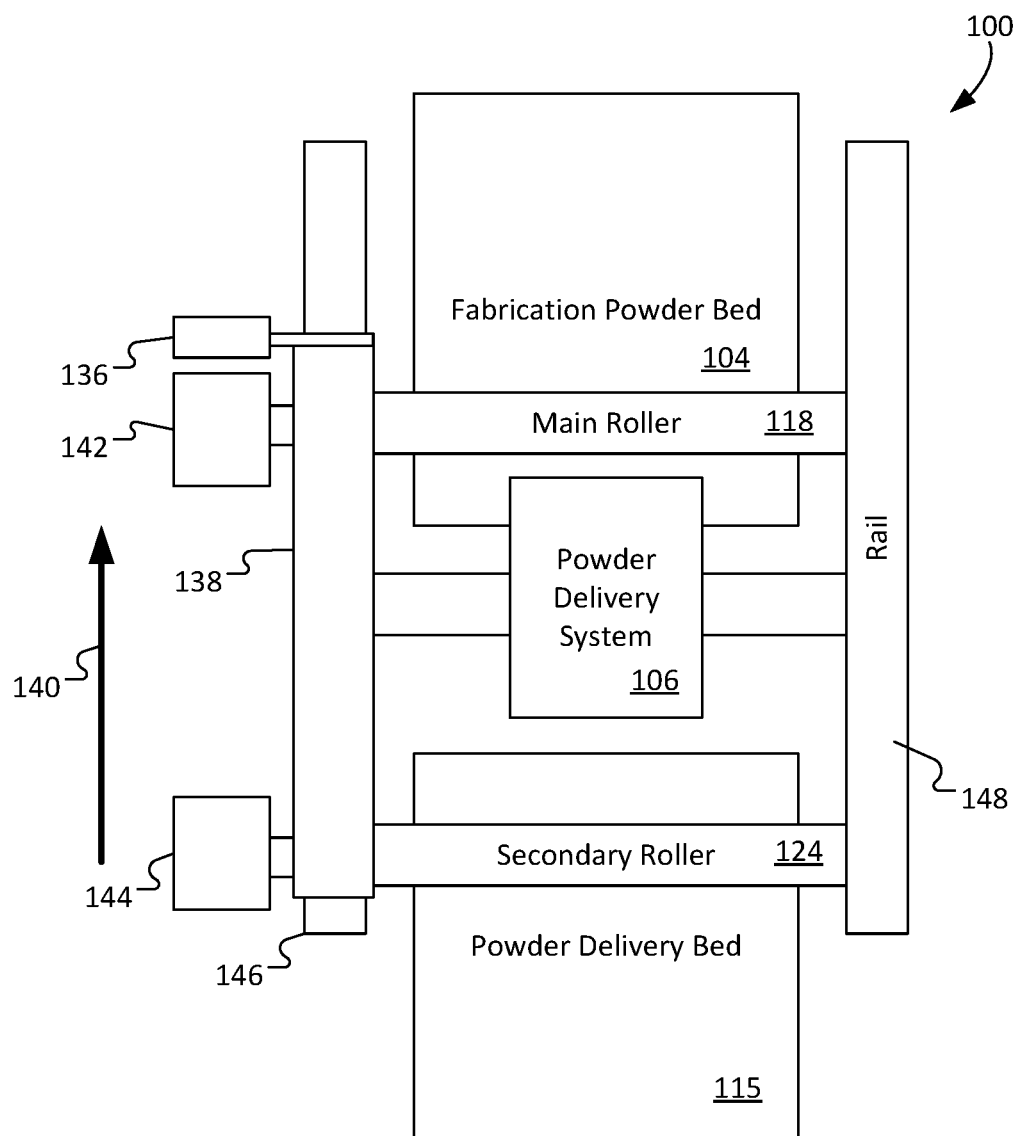
FIG. 1B is a schematic top view of the example additive manufacturing apparatus of FIG. 1A.

FIG. 1B shows an example top view of the AM apparatus 100. A controller 136 controls operations of the AM apparatus 100, including the powder delivery system 106, the main roller 118, and the secondary roller 124. The controller 136, for example, operates a drive train including a linear actuator 138. The controller 136 operates the linear actuator 138 to move the beam device 130, the powder delivery system 106, and the rollers 118, 124 back-and-forth parallel to the top surface of the fabrication powder bed 104. The linear actuator 138 causes movement of these portions along, for example, a direction indicated by an arrow 140. The controller 136 also operates motors 142 144 of the drive train, which are connected to main roller 118 and the secondary roller 124, respectively. The motors 142, 144 rotate the rollers 118, 124, respectively, so that the rollers 118, 124 can displace and compact the first and second powder particles 110, 112 on the fabrication powder bed 104 as the rollers 118, 124 move across the top of the fabrication powder bed 104. Rotation and lateral movement of the main roller 118 also causes displacement of the first powder particles 110 from the powder delivery bed 115 toward the fabrication powder bed 104. The powder delivery system 106 is supported by, for example, rails 146, 148.

The AM apparatus 100 and components of the AM apparatus 100 can additionally or alternatively include other features described herein. In some implementations, one or both of the rollers 118, 124 have an active temperature control of the roller surface, e.g. by running a cooling agent across the internal core of the roller. The rollers 118, 124 are formed of for example, a metal such as stainless steel, nickel alloys, titanium, or ceramic-coated metal. The rollers have a surface roughness with an arithmetic mean (Ra) of approximately 0.05 μm to 5 μm.

A combination of rollers, blades, dispensers, powder delivery beds, and other appropriate powder dispensing mechanisms can be used to dispense the first and second powder particles 110, 112. Rather than using the main roller 118 to push the first powder particles 110 from the powder delivery bed 115 onto the fabrication powder bed 104 as described with respect to FIG. 1A, in some examples, the powder delivery device of the AM apparatus 100 additionally or alternatively includes a blade that, through linear displacement, pushes the powder particles. The blade can have a front-facing knife-edge that is angled at approximately 5 degrees to 90 degrees to the surface of the support 102 and moves parallel to the surface of the support 102 so that a uniform mono-particle or dual particle layer is created. The blade pushes powder particles from the powder delivery bed 115 to the fabrication powder bed 104 to form the layer of powder material.

In some examples, rather than pushing the first powder particles 110 from the powder delivery bed 115 adjacent the support 102, the first dispensing system includes a dispensing array that is positionable over the support 102 and that ejects the first powder particles 110 from a nozzle. This dispensing array can be similar to the dispensing array 122 for the second powder particles 112, though the structure of this dispensing array can be adjusted to accommodate the larger diameter of the first powder particles 110. The dispensing array can deliver the first powder particles in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer, e.g., prior to the second particles being dispensed. Alternatively, the first dispensing system can include a dry dispensing mechanism, such as, for example, an array of nozzles assisted by ultrasonic agitation and pressurized inert gas, to dispense the first powder particles 110.

In some implementations, the powder delivery system 106 includes two or more powder delivery beds (e.g., the powder delivery bed 115) positioned on both sides of the primary powder delivery device. One powder delivery bed is for delivering the first powder particles 110, and another powder delivery bed is delivering the second powder particles 112.

In some implementations, the powder delivery system 106 of the AM apparatus 100 dispenses first powder particles 110 and/or second powder particles 112 to form layers of the powder material using dispensing arrays integrated into the main roller 118 and/or the secondary roller 124. The dispensing array, positioned behind the roller 118, 124 or other powder delivery device, follows the powder delivery device as the powder delivery device travels across the layer 108 of the powder material. The dispensing array does not contact the layer 108 during the travels of the powder delivery device.

Rather than using a roller to displace the first powder particles 110, in some examples, the primary powder delivery device is a primary blade that displaces the first powder particles 110. The secondary powder delivery devices can include secondary rollers (e.g., the secondary roller 124) that displace and compact the second powder particles 112 within the layer 108 after the primary blade spreads the powder particles 110, 112 to form the layer 108. In some cases, the secondary powder delivery devices serve to compact the combined powder material including both the first and the second powder particles 110, 112. The second powder delivery devices, for example, compact the first and second powder particles 110, 112 contained in the selected region 113. In some implementations, the second powder delivery devices are also blades.

The AM apparatus 100 can include components to perform bi-directional layering and compaction of second powder particles 112 within a layer of first powder particles 110. In some implementations, the second dispenser includes two dispensing arrays (e.g., the dispensing array 122 for the second powder particles 112 and another dispensing array to also dispense the second powder particles 112) positioned on both sides of a primary powder delivery device of the powder delivery system 106. The primary powder delivery device is, for example, a primary roller or a primary blade (e.g., the main roller 118) that pushes the first powder particles 110 after the first powder particles 110 are delivered to the support 102 or an underlying layer of powder material. The primary powder delivery device delivers the first powder particles 110 from, for example, the powder delivery bed 115 or using a dispensing array.

The powder delivery system 106 additionally or alternatively includes secondary powder delivery devices, such as two secondary rollers or blades on opposite sides of the primary powder delivery device, that enable the bi-directional layering and compaction of the second powder particles 112. The secondary rollers are similar to the secondary roller 124 of FIG. 1A, and the dispensing arrays are similar to the dispensing array 122 of FIG. 1A. Each dispensing array for the second powder particles 112 resides between one of the secondary rollers and the primary powder delivery device. The dispensing arrays for the second powder particles and the secondary rollers resides on each side of the primary powder delivery device. For example, one dispensing array can be a forward dispensing array that trails the primary powder delivery device when the primary powder delivery device or roller traverses the layer 108 of powder materials in a forward direction. The other dispensing array can be a back dispensing array that trails the primary powder delivery device when traveling in a rearward direction opposite to the forward direction.

While the energy beam 132 has generally been described as an energy beam to add heat, in some implementations, the energy beam 132 is an ion beam. The energy beam 132, for example includes electrons and serves as an electron beam. The mirror assembly is disposed along the path of the electron beam, and electrostatically plates, in some cases, interact with the electrons to control deflection of the electron beam. Alternatively or additionally, the energy beam 132 can remain stationary while the support 102 is horizontally displaced. Horizontal displacement of the support 102 moves the target area of the energy beam 132. For a voxel that is to be fused, the beam can be pulsed, or the energy beam 132 can be continuous.

In some cases, rather than including a laser beam to fuse a target area, the energy source includes a digitally addressable heat source in the form of an array of individually controllable light sources. The array includes, for example, vertical-cavity surface-emitting laser (VCSEL) chips, positioned above the support 102. The array of controllable light sources can be a linear array driven by an actuator to scan across the support 102. In some cases, the array is a full two-dimensional array that selectively heats regions of the layer by activating a subset of the individually controllable light sources. Alternatively or in addition, the energy source includes a lamp array to simultaneously heat the entire layer of combined first and second powder particles.

Methods of Using Additive Manufacturing Apparatuses

The AM apparatus 100 and other AM apparatuses described herein can be used to fabricate an object formed from first powder particles 110 and second powder particles 112. The AM apparatus forms layers and fuses regions of the layers to generate fused portions that form the object. The AM apparatus can selectively distribute the second powder particles 112 within localized or selected regions of the layers depending on the desired properties of the fused portions. These selected regions correspond to, for example, an exterior surface of the object to be formed. After fusing the regions of the layers within the selected regions, the fused portions form the exterior surface.

By way of example, in a layer-by-layer AM process, the AM apparatus 100 can dispense first powder particles 110 uniformly throughout a layer and then can selectively dispense second powder particles 112 within the selected region 113. The AM apparatus 100 can then fuse the first and second powder particles 110, 112 to form a fused portion. After printing and fabrication of the object is complete, the fused portion defines part of the exterior surface of the object. The exterior surface formed from these processes can include complex surface geometry with high resolution and reduced surface roughness in a desired range. The methods and processes enable the AM apparatus to efficiently create these exterior surfaces.

Figure 3A:
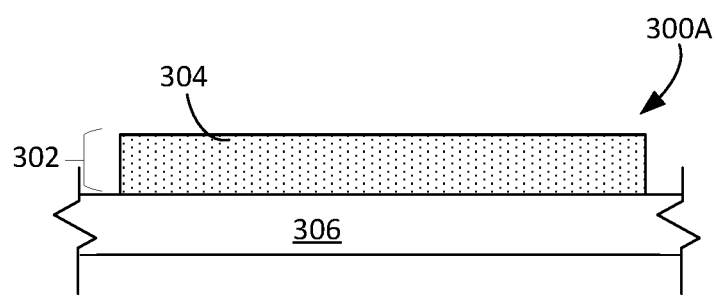
FIGS. 3A to 3H are schematic side views of a support and illustrate another example process of successively dispensing and fusing first and second particles in multiple layers.
Figure 3B:
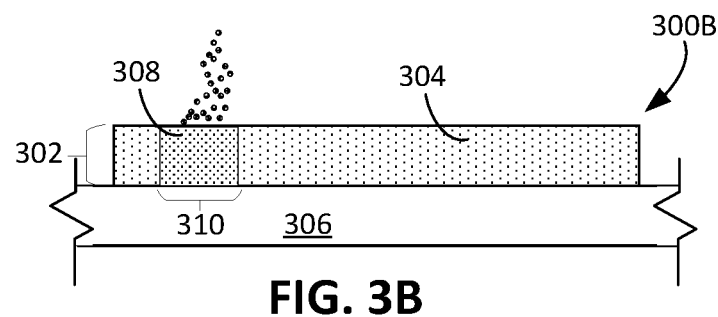
Figure 4:
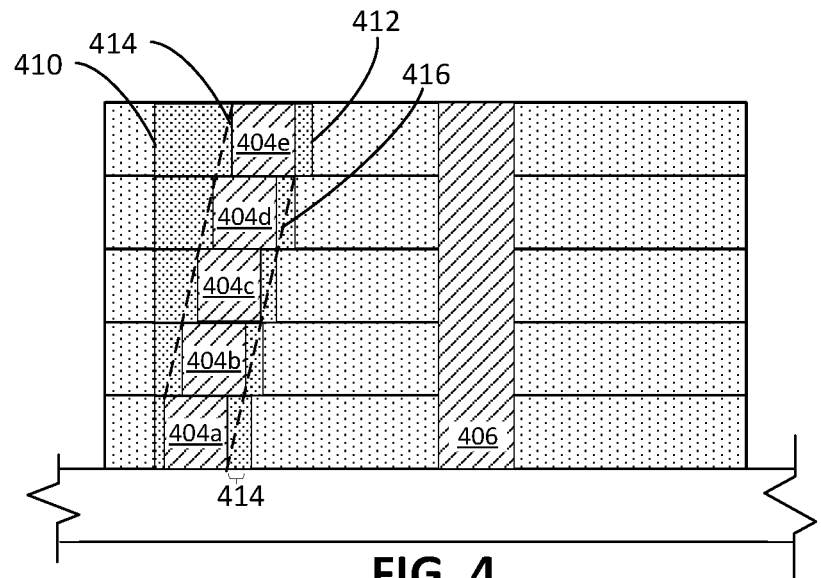
FIG. 4 is a schematic side view of multiple layers of first and second particles on a support in which each layer includes a selected region including the second particles that is laterally offset between adjacent layers.
Figure 5:
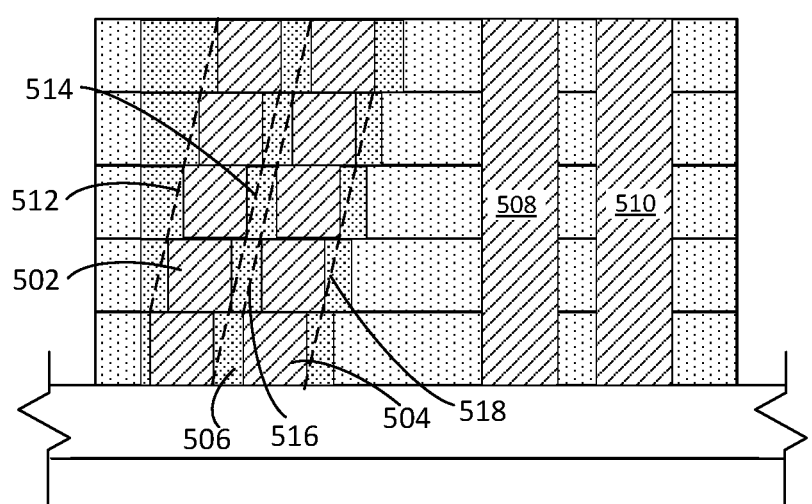
FIG. 5 is a schematic side view of multiple layers of first and second particles on a support in which each layer includes a selected region including the second particles in which multiple portions of the selected region are fused.
Figure 6:
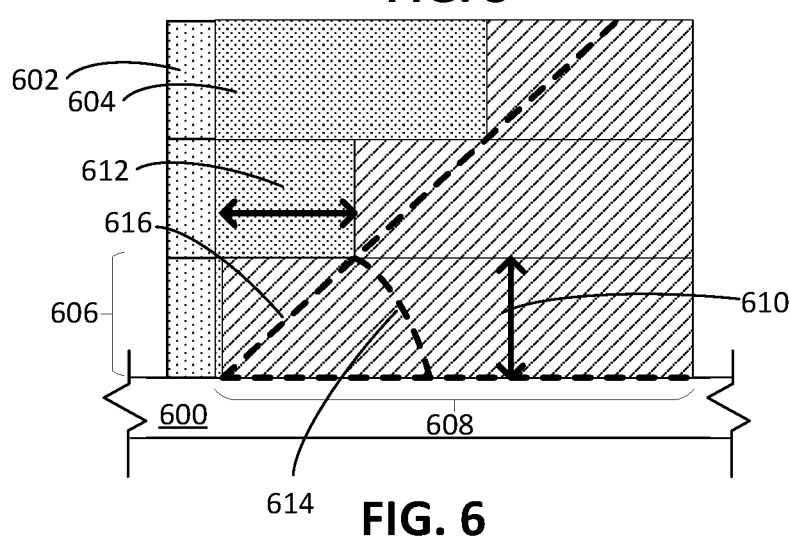
FIG. 6 is an enlarged schematic side view of multiple layers of first and second particles on a support in which each layer includes a selected region of the second particles that is laterally offset between adjacent layers.

In some cases, an AM apparatus, in a process described with respect to FIGS. 2A to 2G, dispenses second powder particles within a selected region that has a perimeter similar to perimeters of the selected regions of other layers dispensed to form the object. In the example process of FIGS. 2A to 2G, the profile of the exterior surface is generally perpendicular to the support for the layers (e.g., a vertical profile). In some implementations, the AM apparatus, in a process described with respect to FIGS. 3A to 3H, dispenses the second powder particles within a selected region whose perimeter is laterally offset from the perimeters of the selected regions of other layers. The profile of the exterior surface formed using this process is angled relative to the support of the layers (e.g., an angled profile). FIGS. 4 and 5 also depict example processes in which perimeters of the selected regions are offset from one another, and FIG. 6 shows parameters that the AM apparatus controls in order to control a trajectory of a profile of the exterior surface of the object.

An example method of using an AM apparatus (e.g., the AM apparatus 100) to form an object is described with respect to FIGS. 2A to 2G. FIGS. 2A to 2G illustrate side views of a support 206 for an AM apparatus as the AM apparatus performs various operations 200A to 200G. The AM apparatus forms the object using feed material including different sized particles. The object to be formed using the AM apparatus has three-dimensional geometry defined by exterior surfaces that enclose interior portions of the object. In the case shown in FIGS. 2A to 2G, the exterior surface has an inner portion and an outer portion parallel to one another.

Figure 2A:
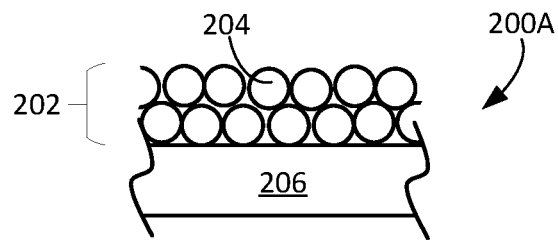
FIGS. 2A to 2G are schematic side views of a support and illustrate an example process of successively dispensing and fusing first and second particles in multiple layers.

The AM apparatus begins by placing feed material on a support 206, as shown in FIG. 2A. At operation 200A, the AM apparatus dispenses a layer 202 of first powder particles 204 (e.g., the first powder particles 110 of FIG. 1A) serving as the feed material. The first powder particles 204 have a first mean diameter. If the layer 202 is the first layer dispensed, the AM apparatus dispenses the first powder particles 204 on a support 206 of the AM apparatus. If an underlying layer has already been dispensed onto the support 206, the AM apparatus dispenses the first powder particles 204 on the underlying layer.

During the operation 200A, the AM apparatus uses, for example, the powder delivery system and the first dispensing system described with respect to FIG. 1A to dispense the first powder particles 204. For example, referring to FIG. 1A, to form the layer 108 of the first powder particles 110, the AM apparatus 100 pushes first powder particles 110 having a first mean diameter across the support 102 or previously deposited layer on the support 102 using the main roller 118. The roller 118 rotates in a counter-clockwise direction to travel from a left side of the AM apparatus 100 to a right side. The main roller 118 is positioned at a height above the layer 108 equivalent to the desired thickness. The main roller 118 traverses across the support 102, for example, at approximately 0.1 m/s to 10 m/s and rotate at approximately 10 rpm to 500 rpm to create the layer 108 having a thickness depending on the number of stacked first powder particles 110.

In some implementations, the first dispensing system of the AM apparatus 100 dispenses the first powder particles 110 using the dispensing array. When the first dispensing system uses the dispensing array, the AM apparatus dispenses the layer of first powder particles 110 by ejecting the first powder particles 110 from, for example, a nozzle of the dispensing array.

Figure 2B:
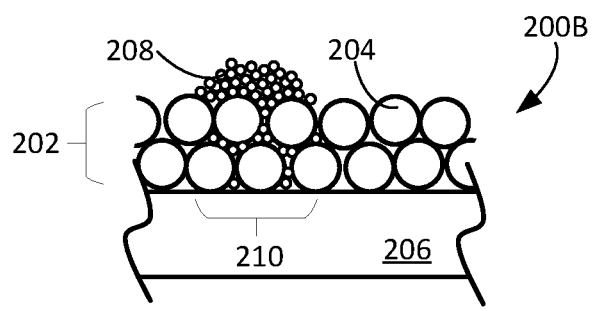

The feed material further includes second powder particles 208 (e.g., the second powder particles 112 of FIG. 1A), as shown in FIG. 2B. With the layer 202 including the first powder particles 204, the AM apparatus proceeds to dispense the second powder particles 208 at operation 200B. The AM apparatus selectively dispenses second powder particles 208 within a selected region 210 of the layer 202. The second powder particles 208, as described herein, have a second mean diameter that is smaller than the first mean diameter of the first powder particles 204. If the layer 202 is the first layer, the AM apparatus dispenses the second powder particles 208 on the support 206. If the layer 202 is dispensed on an underlying layer, the AM apparatus dispenses the second powder particles 208 on the underlying layer. The layer 202 includes first powder particles 204 throughout the layer 202 and second powder particles 208 within the selected region 210. The selected region 210 includes a part of the layer 202 that is located at an outer edge of the portion of the layer to be fused. Thus, when fused, this region 210 defines an outer surface of the object.

During the operation 200B, the AM apparatus uses, for example, the powder delivery system and the second dispensing system described with respect to FIG. 1A to dispense the second powder particles 112 (e.g., the second powder particles 208). Referring back to FIG. 1A, the AM apparatus 100 dispenses second powder particles 112 having a second mean diameter using the dispensing array 122 onto the layer 108 of the first powder particles 110. The AM apparatus 100 controls the dispensing array 122 so that second powder particles 112 infiltrate the layer of first powder particles 110. In particular, the dispensing array 122 dispenses the second powder particles 112 within the selected region 113. The second powder particles 112, upon infiltrating the layer, fill the voids between first powder particles 110.

Referring back to FIG. 2B, during the operation 200B, the AM apparatus compacts the dispensed second powder particles 208 to further fill voids in the layer 202 of powder material. In the example of FIG. 1A, the AM apparatus 100 can rotate the secondary roller 124 counter-clockwise to cause the secondary roller 124 to move from the left side of the AM apparatus 100 to the right side of the AM apparatus 100. The secondary roller 124 traverses a path that follows the main roller 118 and the dispensing array 122. In addition to compacting the second powder particles 112 and causing the second powder particles 112 to infiltrate into the layer 108, the contact between the secondary roller 124 and the second powder particles 112 also pushes excess amount of the second powder particles off the layer 108. The secondary roller 124 can be positioned approximately 0.1 µm above or below waterline of the main roller 118, depending on the degree of compaction required. The secondary roller 124 further levels the powder particles 110, 112 within the layer 108.

By controlling the location of the selected region 113 where the dispensing array 122 dispenses the second powder particles 112, the AM apparatus 100 can control the density of the object within the layer 108. The AM apparatus 100 controls the density of the object within the selected region 113 where the second powder particles 112 are dispensed. The AM apparatus 100 can select the region 113 where the second powder particles 112 are dispensed based on the location of the exterior surface of the object. When the part of the layer 108 within the selected region 113 is fused, the fused portion defines an outer surface of the exterior surface having higher resolution and lower surface roughness. As a result, the selected region 113 of the layer 108 of combined first and second powder particles 110, 112 has a higher density than other regions of the layer 108 having only the first powder particles 110 alone. An average density of the object may not differ substantially from an object formed using only the first powder particles 110. When fusing of the object is complete, the density of the object is between, for example, 0.1% to 1%, 1% to 2%, 2% to 5%, or 5% to 15% greater than the corresponding object formed using only the first powder particles 110.

In some examples, the AM apparatus 100 dispenses a mixture of the both the first and second powder particles 110, 112 within the selected region 113. The powder delivery system 106 includes, for example, a dispensing array that ejects the mixture through a nozzle. The mixture is localized to the selected region 113. Such a dispensing array that dispenses both the first and the second powder particles 110, 112 can be an additional component of the powder delivery system 106, which additionally includes the first dispensing system to dispense the layer 108 of the first powder particles 110 alone.

Figure 2C:
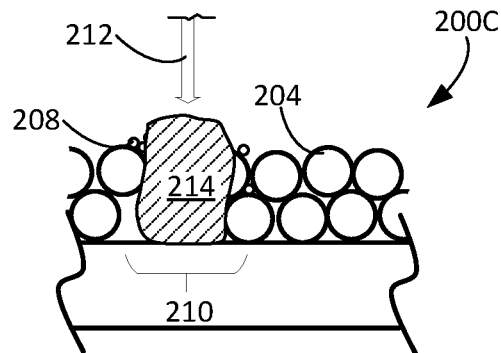
Figure 2D:
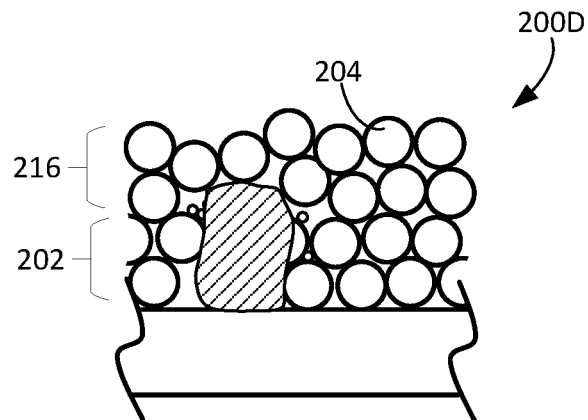
Figure 2E:
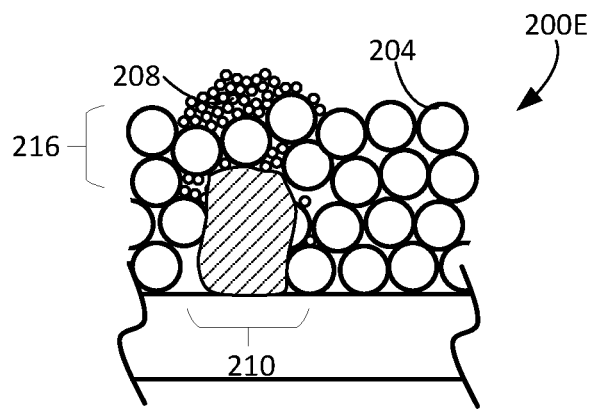

At operation 200C of FIG. 2C, the AM apparatus directs an energy beam 212 toward the selected region 210 to cause the first and the second powder particles 204, 208 to fuse. At the completion of the operation 200C, the first and the second powder particles 204, 208 form a fused portion 214, while the first and the second powder particles 204, 208 outside of the selected region 210 remain unfused. As described with respect to FIG. 1A, the energy source of the AM apparatus 100 can be positioned over a target area, e.g., the selected region 113. The beam device 130 then emits the energy beam 132 such that only the first and second particles 110, 112 within the selected region 113 fuse.

As shown in FIG. 2C, the second powder particles 208, though dispensed in the selected region 210, may not all fuse during the operation 200C. After the operation 200C, additional unfused second powder particles 208 may remain within the layer 202.

The AM apparatus can proceed to form subsequent layers of the first and second powder particles 204, 208 above the underlying layer 202. At operation 200D of FIG. 2D, the AM apparatus dispenses the first powder particles 204 to form a second layer 216 on the first layer 202. The AM apparatus performs similar steps to perform the operation 200D as described with respect to the operations to dispense the first powder particles 204 in the operation 200A. The layer 216 has an average thickness between one to two diameters of the first powder particles 204. In some implementations, the layer 216 has the same thickness as the layer 202. At operation 200E of FIG. 2E, the AM apparatus then dispenses the second powder particles 208 within the selected region 210 using steps similar to those described with respect to FIG. 2B. The second powder particles 208 infiltrate into the void between the first powder particles 204 of the second layer 216.

Figure 2F:
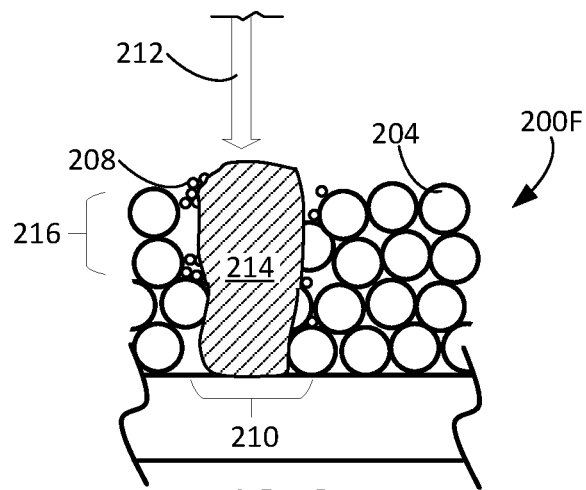

At operation 200F of FIG. 2F, the AM apparatus directs the energy beam 212 toward the selected region 210 to fuse the first and the second powder particles 204, 208 within the selected region 210 using steps similar to those described with respect to FIG. 2C. The AM apparatus sets the power or energy of the energy beam 212 such that the fusing caused by the energy beam 212 is limited to the uppermost layer 216. The fused portion 214 includes both the particles 204, 208 fused as part of the operation 200C and the particles 204, 208 fused as part of the operation 200F.

Figure 2G:
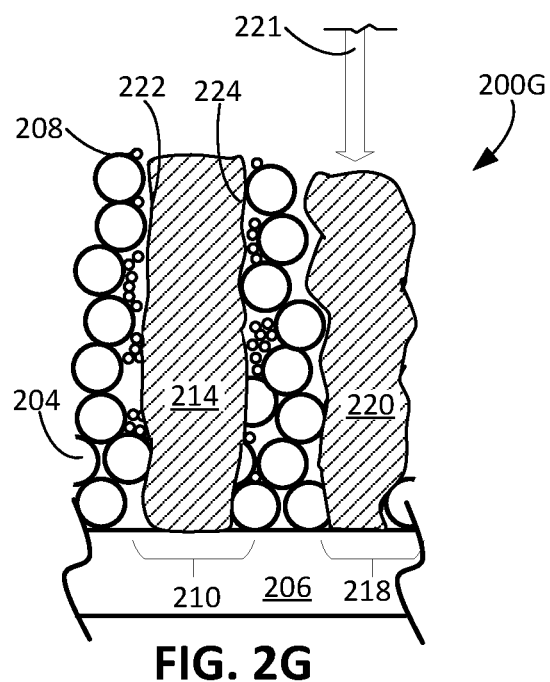

The AM apparatus, at operation 200G of FIG. 2G, successively performs the operation 200D of dispensing the first powder particles 204 to form a subsequent layer over underlying layers, the operation 200E of dispensing the second powder particles 208 within the selected region 210 of the subsequent layer, and the operation 200F of fusing the first and the second powder particles 204, 208 within the selected region 210. Each execution of the operation 200F causes the uppermost layer of first and second powder particles 204, 208 to fuse. The AM apparatus continues forming each layer of the first and the second powder particles 204, 208 and fusing the particles 204, 208 in the selected region 210 until the exterior surface of the object is complete. In some implementations, the AM apparatus continues repeating operation 200G until the fused portion 214 reaches a pre-determined height corresponding to the height of the exterior surface of the object.

Upon reaching the pre-determined height, during the operation 200G, the AM apparatus proceeds to fuse an interior region 218. The AM apparatus performs a bulk fusing process that fuses the first powder particles 204 within the interior region 218 through all of the layers on the support 206, thus forming a fused portion 220. In some implementations, to perform the bulk fusing process, the AM apparatus emits an energy beam 221 to form the fused portion 220. The energy beam 221 has a greater power than the energy beam 212 of operations 2C and 2F such that the first powder particles 204 through all of the layers or a group of the layers fuse. The power of the energy beam 221 depends on, for example, the number of layers required to be fused. For example, if the energy beam 212 fuses a single layer and the energy beam 221 fuses four layers at once, the energy beam 221 can have four times greater power than the energy beam 212.

The fused portion 220 corresponds to an interior portion of the object. As shown in FIG. 2G, the fused portion 214 defines an outer edge of the portion of the layer to be fused. This permits the exterior surface of the object to have a smoother surface roughness than the fused portion 220 corresponding to the interior portions of the object. The fused portion 214 has a greater density than the fused portion 220, as the fused portion 214 includes both the first and the second powder particles 204, 208 while the fused portion 220 includes only the first powder particles 204.

The particle sizes of the first and the second powder particles 204, 208 determine the degree to which profiles of the fused portions 214, 220 deviate from a linear vertical profile. As the first powder particles 204 are larger than the second powder particles 208, the fused portion 220—which includes only the first powder particles 204—has a profile that deviates more from a linear vertical profile than a profile of the fused portion 214, which includes both the first powder particles 204 and the second powder particles 208. The smaller second powder particles 208 enables the profile of the fused portion 214 to more closely follow a linear vertical profile. The amount of deviation from a linear vertical profile can be proportional to an average size of the powder particle. Thus, fusing a portion containing only the first powder particles 204 results in more deviation than fusing a portion containing both the first powder particles 204 and the second powder particles 208.

In some examples, rather than corresponding to the height of the exterior surface of the object, the pre-determined height corresponds to a height of a group of layers that makes up a portion of the total height of the exterior surface of the object. For example, the laser power used to fuse the fused portion 220 may be able to fuse through a pre-determined number of layers. Once the group of layers reaches that pre-determined number of layers, the AM apparatus proceeds to fusing a volume of the group of layers in the interior region 218. The volume extends through all or several of the layers within the group of layers. The AM apparatus then repeats operations 200A to 200G, dispensing and fusing another group of layers atop of the first group of layers.

As the pre-determined height or the pre-determined number of layers within each group of layers increases, the amount of power of the energy beam 221 required to perform the bulk fusing process increases. For larger amounts of power, the energy that the energy beam 221 adds to the group of layers can cause additional fusing outside of the region directly beneath the energy beam 221. The larger amounts of power can thus cause the profile of the fused portion 220 to deviate more than the profile of the fused portion 214, which is formed with the lower power energy beam 212.

As shown in FIG. 2G, the fused portion 214 includes an inner profile 222 and an outer profile 224 parallel to the inner profile 222. A perimeter of the selected region 210 does not vary between dispensing adjacent layers of the object, so the profile of the inner profile 222 matches the profile of the outer profile 224. The operations 200A to 200G enable the AM apparatus to form a profile for an exterior surface that is generally perpendicular to the support 206 (e.g., between 85 degrees to 95 degrees relative to a surface defining the support 206).

The layer-by-layer fusing described in operations 200A to 200F provides greater precision and control of the features of the exterior surface, including high resolution and lower surface roughness. The AM apparatus fuses a portion of each layer corresponding to the exterior surface of the object after dispensing each layer. In contrast, the AM apparatus fuses a portion of a group of layers corresponding to the interior portions of the object after dispensing the group of layers. Because the fusing to define the exterior surface occurs after dispensing each layer, the AM apparatus is able to achieve greater precision and higher resolution on the exterior surface as compared to the interior portions in which fusing occurs for the group of layers. Such a feature of the AM process in conjunction with using both the first and second powder particles allows the exterior surface to attain the complex characteristics described herein.

While the exterior surface described with respect to operations 200A to 200G is generally perpendicular to the support 206, in some cases, an object to be printed using the AM apparatus includes exterior surfaces with profiles that are sloped relative to a support of the AM apparatus. An example method of using an AM apparatus (e.g., the AM apparatus 100) to form an object having such characteristics is described with respect to FIGS. 3A to 3H. FIGS. 3A to 3H depict side views of a support 306 that holds the object as layers of first and second powder particles are dispensed and fused. The object to be formed using the AM apparatus has three-dimensional geometry defined by an exterior surface that encloses interior portions of the object. The outer surface is defined by the edge of the fused portion of each individual layer.

In the case shown in FIGS. 3A to 3H, the exterior surface has an inner portion perpendicular to a support and an outer portion angled relative to the support. In contrast to the operations 200A to 200G, operations 300A to 300H depicted in FIGS. 3A to 3H enable the AM apparatus to form an exterior surface having a portion that is sloped relative to the underlying support. The operations 300A to 300H depict dispensing and fusing a group of layers.

The operations 300A to 300B are similar to the dispensing and fusing operations performed in the operations 200A to 200B described herein. At operation 300A of FIG. 3A, the AM apparatus dispenses a layer 302 of first powder particles 304 (e.g., the first powder particles 110 of FIG. 1A) on a support 306 (e.g., the support 102 of FIG. 1A). At operation 300B of FIG. 3B, the AM apparatus dispenses second powder particles 308 (e.g., the second powder particles 112 of FIG. 1A) within a selected region 310 of the layer 302 on the support 306. As described herein, the second powder particles 308 have a mean diameter that is smaller than a mean diameter of the first powder particles 304.

Figure 3C:
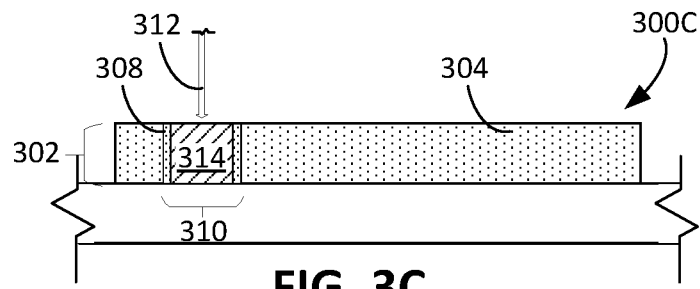
Figure 3D:
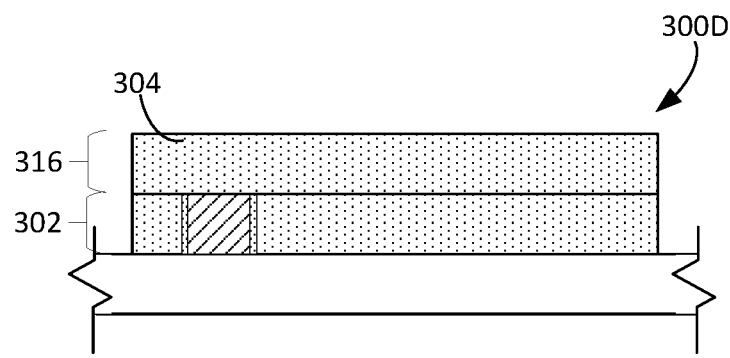
Figure 3E:
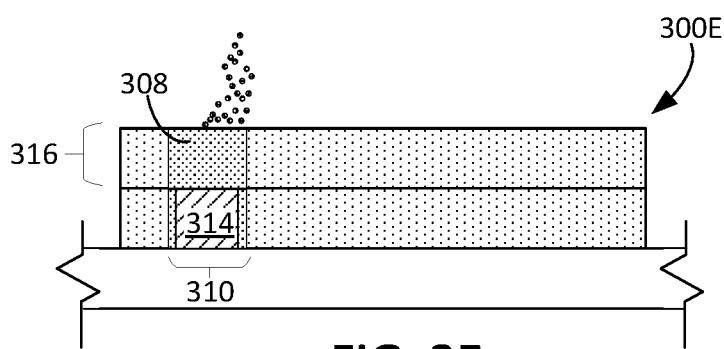

Similar to operation 200C of FIG. 2C, at operation 300C of FIG. 3C, the AM apparatus fuses the first powder particles 304 and the second powder particles 308 within the selected region 310 using an energy beam 312. The energy beam 312 is directed to a part of the selected region 310 to form a first fused portion 314 within the layer 302. The first fused portion 314 includes both the first and second powder particles 304, 308. As shown in FIG. 3C, the energy beam 312 may not fuse all of the first and the second powder particles 304, 308 within the selected region 310. Rather, the energy beam 312 may fuse a subset of the particles 304, 308 within that selected region 310 to form the first fused portion 314. Similar to operation 200D of FIG. 2D, at operation 300D of FIG. 3D, the AM apparatus dispenses another layer 316 of first powder particles 304 on top of the layer 302. Then, at operation 300E of FIG. 3E, the AM apparatus dispenses second powder particles 308 within the selected region 310.

Figure 3F:
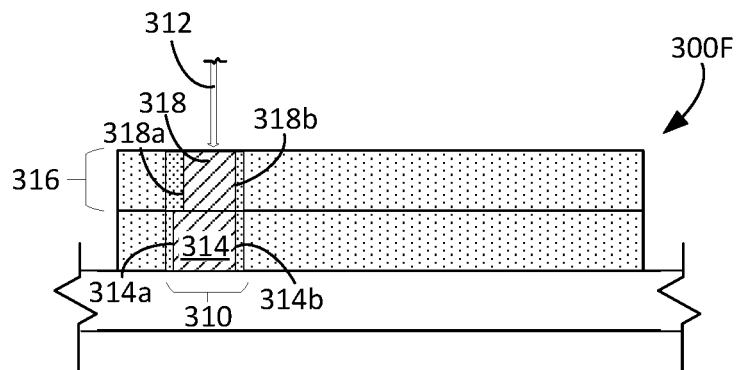
Figure 3G:
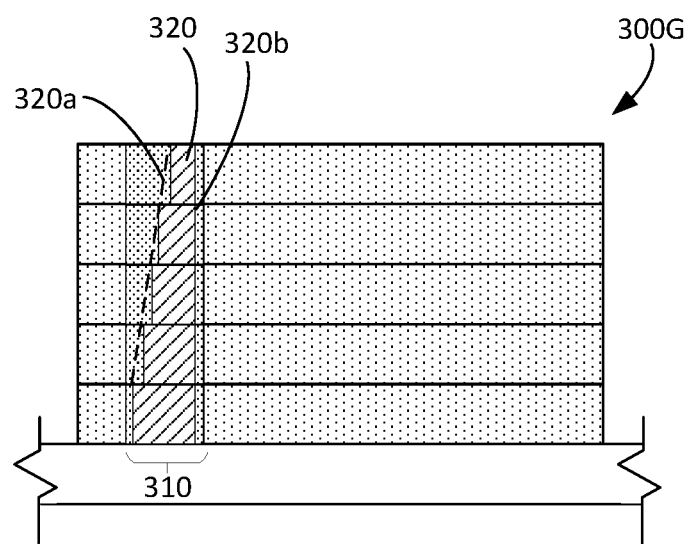

At operation 300F of FIG. 3F, the AM apparatus directs the energy beam 312 toward a portion of the selected region 310 to form a second fused portion 318 within the layer 316. The object to be formed using the process illustrated in FIGS. 3A to 3G includes interior portions and exterior portions. The exterior portions include the exterior surface of the object, and the selected region 310 is selected such that, when the first and second powder particles 304, 308 within the selected region 310 are fused, the fused portions 314, 318 define the exterior portions and the exterior surface of the object.

As shown in FIG. 3F, the second fused portion 318 has an outer edge 318a (in the plane parallel to the surface of the support) that is offset from an outer edge 314a of the first fused portion 314. An inner edge 318b of the second fused portion 318 may be coincident with an inner edge 314b of the first fused portion 314, although this is not required.

At operation 300G, the AM apparatus repeats the operations 300A to 300F to form several layers of the object within the selected region 310 until the exterior surface of the object is complete. The fused portion of each subsequent layer has an outer edge laterally offset relative to an outer edge of the fused portion of the underlying layer. Thus, the operations 300A to 300G enable the AM apparatus to form an exterior fused portion 320 having a sloped exterior profile 320a. The AM apparatus continues dispensing layers to form the group of layers and fusing the layers within the selected region 310 until the number of layers in the group of layers reaches a pre-determined height or a pre-determined number of layers, as described with respect to the operation 200G.

Figure 3H:
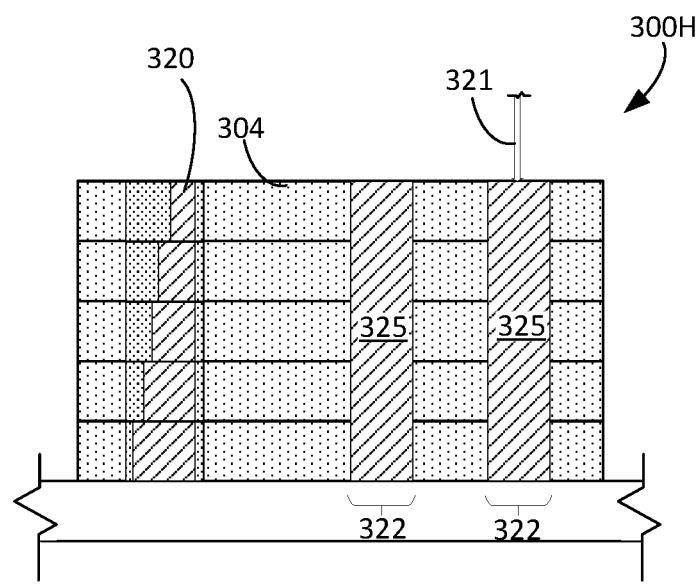

At operation 300H of FIG. 3H, after the AM apparatus has reached the pre-determined height or the pre-determined number of layers, the AM apparatus directs an energy beam 321 toward one or more regions 322 of the layers of the first powder particles 304 to form fused portions 325. The regions 322 correspond to the solid interior portions of the object. The energy beam 321 fuses the first powder particles 304 within the regions 322. Although the regions 322 are illustrated as laterally separated from the region 320 that corresponds to the exterior surface, this is not required and the interior regions could abut the region corresponding to the exterior surface.

The AM apparatus modulates the energy beam 321 such that the energy from the energy beam 321 causes first powder particles 304 to fuse through multiple layers. For example, the energy beam 321 can fuse a group of three to ten layers. The energy beam 321 thus may have a greater power than the energy beam 312, as described herein with respect to the energy beam 212 and the energy beam 221. The AM process, forming the fused portions 325, 326 in a bulk fusing operation improves overall throughput of the process illustrated in FIGS. 3A to 3H.

As shown in FIG. 3H, at this point during the AM process illustrated in FIGS. 3A to 3H, the object includes the exterior fused portion 320 and the interior fused portions 325 and 326. The exterior fused portion 320 has the sloped exterior profile 320b and a vertical inner profile 320a, while the interior fused portions 325 and 326 have vertical profiles. Because the exterior fused portion 320 was formed from both first powder particles 304 and second powder particles 308, which have the smaller mean diameter, the exterior fused portion 320 has a lower surface roughness as compared to the interior fused portions 325 and 326. The lower surface roughness of the exterior fused portion 320, which forms the exterior surface of object, can improve aesthetic of the object to be produced.

Although the inner profile 320a and the profiles of the fused portions 325 and 326 are depicted as vertical, the inner profile 320a of the exterior fused portion 320 can more closely follows a linear vertical profile than the profiles of the fused portions 325 and 326. As described with respect to FIG. 2G, because the fused portions 325 and 326 are made up of only the first powder particles 304, the larger size of the first powder particles 304 cause the profiles of the fused portions 325 and 326 to deviate from a linear vertical profile.

Also as described with respect to FIG. 2G, the profiles of the fused portions 325 and 326 can further deviate from a linear vertical profile because the AM apparatus uses a higher power energy beam to fuse through several layers to form the fused portions 325, 326.

After the operation 300H, as described with respect to the operations 200A to 200G, the AM apparatus can repeat operations 300A to 300H to dispense another group of layers atop of the first group of layers. And, for each layer within the group of layers, the AM apparatus fuses the selected region 310 to form an outer edge of the exterior surface. The AM apparatus then proceeds to fuse a volume in an interior portion of the group of layers. The volume extends through several or all of the layers within the new group of layers.

In short, depositing the plurality of layers can include depositing multiple groups of layers, with each group of layers including a plurality of layers. At least some of layers are fused individually, and at least some of the groups of layers are fused simultaneously. The process of depositing a group of layers can be performed iteratively for multiple groups of layers. That is, after fusing a first group of layers, the process can restart as shown in FIG. 3A by depositing a second group of layers over the first group of layers. For each individual layer in the second group, fusing of the selected portion is performed. Once the entire second group of layers is deposited, the higher power energy beam can then be used to fuse one or more regions that extend through multiple layers of the second group.

In addition, because the exterior fused portion 320 was formed from both first powder particles 304 and second powder particles 308, which have the smaller mean diameter, the exterior fused portion 320 has a lower surface roughness as compared to the interior fused portions 325 and 326. The lower surface roughness of the exterior fused portion 320, which forms the exterior surface of object, can improve aesthetic of the object to be produced.

Even with the sloped exterior profile, the process illustrated in FIGS. 3A to 3H can achieve a surface roughness lower than a surface roughness expected using only the first powder particles 304. In addition to the benefits enabled by the use of the smaller second powder particles 308, fusing of portions of the fused portion 320 occurring after each layer was dispensed allows the AM apparatus to achieve improved precision and resolution as compared to the resolution of the fused portions 325, 326.

While the process illustrated in FIGS. 3A to 3G depict the exterior fused portion 320 to have the sloped exterior profile 320b and the vertical inner profile 320a, in some implementations, an AM process can form an exterior fused portion having a sloped exterior profile as well as a sloped inner profile. FIG. 4 shows a side view of an AM apparatus supporting layers of first and second powder particles after such an AM process has been executed. Referring to FIG. 4, a fused portion 404a to 404e in each layer, is laterally offset from the fused portions 404a to 404e in the other layers. At the point during the process illustrated in FIG. 4, the AM apparatus has fused the portions 404a to 404e and has also fused interior portions 406, 408. The fused portions 404a to 404e were produced using the operations and processes described herein in which both first and second powder particles are fused together, while the fused interior portions 406, 408 only include the first powder particles. Thus the fused portions 404a to 404e can achieve lower surface roughnesses than the fused portions 406, 408.

In the layer-by-layer fabrication process to form the fused portions 404a to 404e, the AM apparatus dispenses the second powder particles in a selected region of a layer and then directs an energy beam to fuse a portion within the selected region of the layer. The selected region can vary in size between adjacent layers. As shown in FIG. 4, the selected region increases in size for subsequent layers. FIG. 4 illustrates that an outer perimeter 410 of the selected region of each layer remains at a similar location for each layer and an inner perimeter 412 of the selected region of each layer is shifted inward. In some implementations though, both the outer and the inner perimeters 410, 412 are shifted an equal distance. As a result, the selected regions of different layers are the same size.

After dispensing the second powder particles within the selected region of a layer, the energy beam fuses the first and the second powder particles to form a fused portion. In some implementations, the energy beam shifts a predetermined distance after each layer. The energy beam, for example, fuses an equally sized part of each layer. In this regard, each of the fused portions 404a to 404e are equally sized but are shifted relative to one another. The fused portions 404a to 404e are offset from each other a distance similar to the offset between the inner and/or outer perimeters 410, 412.

To achieve a lateral offset 414 between the fused portions 404a to 404e, the AM apparatus shifts a location of the energy beam after forming the fused portion 404a to 404e in each layer. The lateral offset 414 allows an exterior surface of the object to have both a sloped exterior profile 414 and a sloped inner profile 416. In contrast to the process illustrated in FIGS. 3A to 3G in which the width of the fused portion varies layer-by-layer, the width of each of the fused portions 404a to 404e is equally sized. Furthermore, the fused portions 404a to 404e together define an exterior surface of the object that is sloped on both an interior and exterior surface. In other words, the inner and outer profiles 414, 416 of the exterior surface are both sloped, while the inner profile 320a is vertical for the fused portion 320 of FIG. 3G. The widths of the fused portions 404a to 404e define the thickness of the exterior surface of the object. The process described herein with respect to FIG. 4 enables the AM apparatus to achieve an exterior surface for an object that has a uniform thickness through its height. The process achieves complex geometry and lower surface roughness on both interior and exterior portions of the exterior of the object.

While described as equally sized, the fused portions 404a to 404e can vary in size from layer to layer in some implementations. The inner and outer profiles 414, 416 are illustrated to have a constant slope, but by varying the location of the edge of the fused portions 404a to 404e between adjacent layers, the AM apparatus achieve variations in the slopes of the inner and outer profiles 414, 416. Such variations enable the AM apparatus to form exterior surfaces having complex curves and other geometries.

In some implementations, it may be beneficial to have a high structural rigidity while keeping an overall weight of an object low. For example, in cases where structural fit and precision geometry is required to improve fit with an object, the AM apparatus can implement a process in which the exterior surface is formed from multiple fused portions including both first and second powder particles. Rather than forming an exterior surface having a greater thickness, the AM apparatus forms the multiple fused portions to define the exterior surface. The combined properties of the multiple fused portions bestow greater structural rigidity but add less weight to the object as compared to an object formed with a single fused portion of greater thickness.

FIG. 5 illustrates a side view of an AM apparatus after an AM process that fuses multiple portions in each selected region of a layer is executed. As shown in FIG. 5, the AM apparatus forms two fused portions 502, 504 formed from both first and second powder particles. To form these fused portions 502, 504, for each layer of the powder particles, the AM apparatus dispenses the second powder particles within a selected region. To achieve a sloped profile, in some cases, the size of the selected region containing the second powder particles and the first powder particles increases with each subsequent layer.

The fused portions 502, 504 are separated by an unfused interstitial portion 506. The AM apparatus does not fuse the unfused interstitial portion 506 during the layer-by-layer fusing operations. After completing the layer-by-layer fusing of the first and the second powder particles within the selected region of each of the layers, the AM apparatus fuses the first powder particles corresponding to locations of the interior portions of the object. The AM apparatus also forms the two fused portions 508, 510, which form the interior portions of the object and include only include the first powder particles.

During each layer-by-layer fusing operation, the AM apparatus fuses at least the two portions that eventually form the fused portions 502, 504. To form the fused portions 502, 504 using the layer-by-layer processes described herein, for each layer, the AM apparatus fuses two separate portions including both the first and the second powder particles. Those two separate portions are part of the fused portions 502, 504, respectively. The AM apparatus maintains an unfused portion in between the two fused portions in each layer. The unfused portion is part of the unfused interstitial portion 506. The AM apparatus laterally offsets the fused portions in each layer with each layer to achieve a sloped exterior profile 512 and a sloped inner profile 514 for the fused portion 502 and a sloped exterior profile 516 and a sloped interior profile 518 for the fused portion 504. By maintaining the unfused portions within the selected region of each layer, which form the unfused interstitial portion 506, and fusing the portions forming the fused portions 502, 504 the AM apparatus achieves greater structural rigidity, lower surface roughness for the exterior surface, and sloped profiles for the exterior surface without large increases in weight in the object that would be expected if the unfused interstitial portions 506 were fused.

While the sloped exterior profiles 512, 516 are depicted as parallel and the sloped interior profiles 514, 518 are depicted as parallel, in some cases, the profiles may be angled relative to one another so that the exterior surface includes complex geometries. The slopes of the profiles vary between different layers in some cases. The AM apparatus further modulates the slope of the profiles by fusing portions of different widths. The size of the fused portions in each layer further define the overall thickness of the exterior surface of the object. If the widths of the individual fused portions in each layer vary, the thickness of the exterior surface of the object varies as well.

While the selected region is illustrated as continuous and increasing in size with subsequent layers of the first and the second powder particles, in some implementations, each layer includes two or more selected regions including the second powder particles. These two or more selected regions are separated from each other by a portion only having the first powder particles. Thus, in such cases, the unfused interstitial portion, alternatively or additionally includes a portion having only the first powder particles.

To control the profiles of the exterior surface of the object, the AM apparatus adjust parameters of the dispensing and fusing operations. FIG. 6 depicts an enlarged side view of multiple layers of first and second powder particles supported by an AM apparatus. FIG. 6 depicts examples of the parameters that can be used to modulate the profiles of the exterior surface. As shown in FIG. 6, on a support 600 of the AM apparatus, each layer of first powder particles 602 includes selected regions having both first powder particles 602 and second powder particles 604. For example, a first layer 606 includes a selected region 608 that contains the first powder particles 602 infiltrated by the second powder particles 604.

The AM apparatus adjusts a layer thickness 610 and a step distance 612 to control an angle 614 of a profile 616 of an object. As described herein, the first powder particles 602 have a greater diameter than the second powder particles 604. The layer thickness 610 is proportional to a thickness of the first powder particles 602 dispensed during an initial dispensing operation on the support 600 of the AM apparatus and a number of the first powder particles 602 that are stacked on one another. These parameters for the first powder particles 602 are described herein elsewhere.

The step distance 612 corresponds to a lateral offset (e.g., the lateral offset 414 as described with respect to FIG. 4) between fused portions including the first and second powder particles 602, 604 between each layer. The AM apparatus controls the step distance 612 by, for example, adjusting a lateral displacement of an energy source that fuses the fused portions. In some implementations, the AM apparatus controls a location of an energy beam directed toward each layer.

The AM apparatus thus controls the layer thickness 610 and the step distance to achieve the profile 616 having the angle 614. For a given first powder particle 602 having a first mean diameter, the AM apparatus selects the layer thickness 610 by modulating the number of first powder particles 602 stacked in each layer. The AM apparatus then selects the step distance 612 to define the angle 614 of the profile 616. In some implementations, the AM apparatus keeps the layer thickness 610 the same for fabrication of most objects. The layer thickness 610 can be a pre-determined quantity stored in memory of the AM apparatus, and the AM apparatus computes a step distance 612 required to achieve a desired angle 614. The AM apparatus selects a step distance 612 equal to the layer thickness 610 divided by the tangent of the desired angle 614.

While implementations of the AM apparatus described herein include two types of particles (e.g., the first and the second powder particles), in some cases, additional types of particles can be used. In some implementations, prior to displacing the first powder particles to form a layer, the apparatus dispenses third powder particles onto the platen or underlying previously dispensed layer. This third powder particles can provide a thin layer onto which the first powder particles are dispensed. The third powder particles have a mean diameter that is at least two times smaller than the first mean diameter. This permits the first powder particles to settle into the layer of third powder particles. This technique can increase the density of the object at the bottom of the layer of first powder particles, e.g., if the second powder particles cannot infiltrate to the bottom of the layer of first powder particles.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

Controllers can implement the operations and processed described herein. Referring to FIG. 1B by way of example, the controller 136 of the AM apparatus 100 is connected to the various components of the AM apparatus 100, e.g., actuators, valves, and voltage sources, to generate signals to those components and coordinate the operation and cause the AM apparatus 100 to carry out the various functional operations or sequence of steps described above. The controller 136, for example, controls the location where feed material, including the first and second powder particles 110, 112. The controller 136 also controls the intensity of the energy source based on the number of layers in a group of layers to be fused at once. The controller 136 also controls the location where energy is added by, for example, moving the energy source with the linear actuator 138.

The controller 136 can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

As noted above, the controller 136 can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 136, e.g., as controlled by firmware or software, can interpret the data object received from the computer to generate the set of signals necessary to control the components of the AM apparatus 100 to fuse the specified pattern for each layer or group of layers. Thus, the controller 136 can control the location and intensity of energy beam. In addition, if second feed material is to be used for selected portions of a layer, then the controller can control the dispenser to supply the feed material to the selected portions.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

For example, the exterior surface of an object to be fabricated using the processes and operations described herein can correspond to any surface feature of the object.

By way of example, in fabricating a precision gear, the exterior surface includes surfaces that are interior to an outer circumference of the precision gear as those surfaces are superficial and exposed to the environment. Teeth of the precision gear include surfaces located at portions interior to the outer circumference. The teeth of the precision gear, during use of the precision gear in a mechanical system, contacts other objects and thus can benefit from lower surface roughnesses.

In another example, the object can be a hub for a shaft, and the exterior surface of the hub includes the inner circumference of the hub that contacts the shaft directly. Even though the inner circumference is interior to outer geometries of the hub, the inner circumference is exposed to the environment and is superficial and therefore forms part of the exterior surface of the hub. Other mechanical components that may include exterior surfaces that are interior to other surface geometries includes, for example, screws, cams, sprockets, pulleys, and clamps.

While both first and second powder particles have been described to be dispensed in each layer to achieve varying degrees of surface roughness, in some cases, only the first powder particles are dispensed in each layer within a group of layers. The AM apparatus fuses a selected region in each layer that corresponds to an exterior surface of the object using a low-energy beam. Once the AM apparatus dispenses all of the layer that compose the group of layers, the AM apparatus fuses the group of layers within an interior portion of the object using a high-energy beam. The low-energy beam and the layer-by-layer fusing of the selected region achieves a lower surface roughness than would be achieved by the bulk fusing operation for the interior portion of the object even though only the first powder particles are distributed through each layer. Additionally placing the second powder particles within the selected region further decreases the surface roughness of the exterior surface of the object.

Similarly, while bulk fusing of multiple layers of the interior portion of the object has been described as part of the operations performed by the AM apparatus, in some implementations, the AM apparatus does not perform bulk fusing but rather fuses the interior portion layer-by-layer. The AM apparatus thus does not dispense groups of layer that are subjected to the bulk fusing process. To achieve the lower surface roughness on the exterior surface of the object, the AM apparatus dispenses the smaller second powder particles within the selected region of each layer corresponding to the exterior surface of the object. Additionally using the bulk fusing process can further decrease the surface roughness of the exterior surface of the object. While the energy source has been described as a single laser, two or more lasers each having different powers can be used to perform the fusing operations. One laser having lower power can be used to perform the layer-by-layer fusing, and a second laser having higher power can be used to perform the bulk fusing. Alternatively or additionally, heater lamps can be used to perform bulk fusing through several layers in a group of layers or across several regions of a layer.

The smaller second particles can be used without the fusing of groups of layers in the interior, e.g., each layer can be fused individually at a time. In this case, the use of the second smaller particles can still provide reduced surface roughness to a surface of the object.

The use of the smaller second particles is optional. Individual layers could be fused, e.g., at portions that correspond to edges of the object, and then groups of layers could be fused, but without using the smaller second particles. This improve throughput while maintaining resolution of the surface of the object.

A different energy source, e.g., a second laser, can be used for fusing of the group of layers. The second laser could have a different wavelength than the first laser used for fusing the individual layers.

A number of implementations have been described. Nevertheless, it will be understood that various modifications may be made. Accordingly, other implementations are within the scope of the claims.

What is claimed is:

1. A method of additive manufacturing of an object, comprising:
   successively forming a plurality of layers on a support, wherein depositing a layer from the plurality of layers comprises
   dispensing first particles on a support or an underlying layer, the first particles having a first mean diameter;
   selectively dispensing second particles on the support or the underlying layer in selected regions corresponding to an exterior surface of the object, such that the layer has the first particles throughout and the second particles in the selected regions, the second particles having a second mean diameter at least two times smaller than the first mean diameter; and
   fusing at least a portion of the layer including the selected regions corresponding to an exterior surface of the object and a second portion outside the selected regions corresponding to an interior portion of the object and including the first particles.

2. The method of claim 1, comprising dispensing the second particles after dispensing the first particles so that the second particles infiltrate into a layer of first particles.

3. The method of claim 2, wherein dispensing the first particles comprises pushing the first particles from a reservoir across the support or underlying layer.

4. The method of claim 3, wherein dispensing the second particles comprises ejecting the second particles from a nozzle.

5. The method of claim 1, comprising mixing the first particles and the second particles to provide a mixture of particles and selectively dispensing the mixture of particles in the selected regions.

6. The method of claim 5, wherein dispensing the first particles and selectively dispensing the second particles comprises ejecting the mixture of particles from a nozzle.

7. The method of claim 1, wherein the second mean diameter is about 100 nm to 2 μm.

8. The method of claim 7, wherein the first mean diameter is about 5 μm to 10 μm.

9. The method of claim 1, wherein fusing the portion of the layer comprises applying a laser beam to the layer of the first particles and second particles.

10. The method of claim 1, wherein the first particles and the second particles have the same material composition.

* * * * *